United States Patent Office 3,352,719
Patented Nov. 14, 1967

3,352,719
METHOD OF MAKING SILVER CATALYZED
FUEL CELL ELECTRODE
Burnett M. Schneider, West Allis, Wis., assignor to Allis-Chalmers Manufacturing Company, Milwaukee, Wis.
No Drawing. Filed Nov. 5, 1965, Ser. No. 506,592
5 Claims. (Cl. 136—120)

This invention relates to fuel cell electrodes and particularly to a method of producing silver catalyzed fuel cell electrodes. More particularly, this invention relates to a method of plating a silver catalyst on a substrate such as carbon or nickel for use as an electrode.

The term fuel cell, as used herein, refers to those electrochemical devices that convert the free energy of a chemical reaction directly to electrical energy. Such devices are well known in the art art and although there are differences between various cells, a discussion of some of their common characteristics will aid in the understanding of my invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, the respective reactants must attain an activated state before they can react. The energy input required to reach an activated state, i.e., heat of activation, partly determines the speed of reaction. The greater the energy that is required for activation, the fewer are the molecules possessing this energy at a given temperature, and the slower is the reaction.

In the past, to speed reaction, an external heat source was used to heat fuel cell reactants and thereby activate them. More recently catalysts have been employed to increase reaction rate. Through a mechanistic bypass a catalyst brings about reaction with a smaller heat of activation. Catalysts have made possible the operation of so-called low temperature fuel cells (about 25°–about 300° C.) without a lessening in cell output compared to cells operating at higher temperature. It follows that with more efficient catalysts, the activation energy can be decreased and greater cell outputs attained at a given voltage and temperature.

The catalytic activation of oxygen, air and the like has been accomplished in fuel cells by the use of catalysts such as silver.

The silver (I) solution of this invention comprises an aqueous solution of a reducible source of silver (I) such as silver nitrate; a source of citrate such as sodium citrate; and sufficient hydronium ions to adjust the pH to a level such that precipitation of silver citrate is prevented. Although not required, I find that the addition of hydrogen peroxide and wetting agent, such as a quaternary ammonium salt, aid in the adhesion of the reduced metal to the pore walls, and penetration of the solution into the pores.

In the preparation of the solution, I dissolve $AgNO_3$ in water to make about a six molar solution. This is the concentration I find most suitable because of its relationship to the pore volume of the porous substrates used. Apparently, when other substrates having differing pore diameter and porosity are used, the concentration of the silver (I) is experimentally adjusted to give a sufficient but not extravagant deposit of silver. The substrates referred to in this specification were of sintered nickel and had a homogeneous porosity of about 85%.

Clearly then, the silver nitrate concentration is variable between nine molar, approaching upper limit of solubility, and whatever lesser concentration down to about one molar that proves experimentally satisfactory for the particular substrate. Tests have shown that about a 10% by weight silver content on the electrode is entirely satisfactory; however increases up to 30% do slightly improve performance but do not entirely justify the increased quantity of silver; and less than about 10% causes a fall off in output.

The next component of the solution to be discussed will be the sodium citrate. The sodium citrate forms silver citrate with a reaction between silver nitrate and itself.

The silver citrate in the solution is not soluble so nitric acid has to be added to the solution to dissolve the silver citrate. The citrate in the solution appears to act as a buffer although it is difficult to say because the buffering action would have to take place when the electrode is being reduced in hydrazine solution. This buffering action would take place in the pores of the electrode, so we cannot say for sure but we assume that is a buffer.

The optimum citrate concentration appears to be between 10% and 20% by weight of the silver nitrate solution. Using sodium citrate as an example, good results are produced at 10.5% and 17% sodium citrate. As the amount of citrate present declines, the electrodes produced are decidedly inferior. Although the upper limit of citrate is difficult to determine, I believe it is about 50% sodium citrate. An electrode made at approximately this concentration was not entirely satisfactory. The sodium citrate used contains two waters of hydration and is included in the previously stated weight percent. It is important to know that when more sodium citrate is added it requires more nitric acid to dissolve the precipitate in the solution.

The next component under discussion will be the nitric acid concentration. The lower limit of the nitric acid concentration is determined by the amount of nitric acid required to dissolve the silver citrate precipitate. Clearly as more sodium citrate is used more $HNO_3$ is required. I find it best to only use sufficient nitric acid to dissolve the precipitate. If too much nitric acid is added to the solution, silver will again precipitate out.

The next component of my solution is the hydrogen peroxide. From tests on electrodes that have been run, the optimum peroxide concentration appears to be about 0.901 molar within the solution. The peroxide cleanses the electrode and allows more uniform distribution of the silver when reduced, because of a more uniform distribution of the salt in the pores. It also appears to react with some of the nickel on the electrode producing easily reduced nickel salts. When the silver (I) within the porous substrate is later reduced with hydrazine solution, these nickel salts are also reduced and thereby give an improved surface area which gives a better output.

Thus along with the catalytically active silver, a catalytically active nickel is also produced on the surface. I have run peroxide concentration from zero up to 13 molar without any harmful results such as precipitation.

Next I find it desirable to include a wetting agent within the solution. This is preferably an alkyl tri-methyl ammonium chloride. There are also a number of other wetting agents such as the nonionics that might be used which could be compatible with the solution.

The wetting agent serves to provide a uniform deposition of salt in the pores. It also allows the solution to penetrate through the electrode much faster thus eliminating time required for the solution to penetrate into the electrode. The small pores are penetrated when the solution is added. The lower limit of concentration is without any wetting agent in the solution. This, of course, means reduced outputs.

Often, the wetting agent contains a slight amount of chloride and this, of course, will result in the precipitation of silver chloride upon the substrate pores. However, if the concentration of chloride is only slight, this does not appear to be harmful. The concentration of wetting agent that I have found to be most effective is about 3% by weight of the solution. Sufficient wetting agent is present if the surface tension of the solution is reduced so that the solution can easily and completely penetrate into the pores of the substrate.

The substrate material is then immersed in this silver (I) solution until it is thoroughly saturated. The substrate material that I have found especially suitable are sintered nickel plaques having a pore size of from about 10 to 20 microns. However, substrate materials having somewhat finer pores, averaging about 7 microns, have been used successfully.

After thorough penetration, the substrate material is removed from the silver (I) solution and dried. While room temperature drying is suitable, I find that accelerated drying at about 200° F. tends to partially dissolve some nickel from the pore walls. This nickel upon being subsequently reduced together with the silver (I) yields a catalyst of especially high surface area.

After drying, the substrate material, now carrying the silver catalyst in an oxidized state, is treated with hydrazine reducing agent. Because of availability, I prefer to use $N_2H_4$, however if pH is properly controlled, the alkyl substituted hydrazines are perfectly suitable. It is not necessary to use a pure hydrazine and I find that the commercialy available hydrate (65% aqueous hydrazine) is completely satisfactory.

The hydrazine reducing solution readily reduces any oxidized nickel, and silver (I) present. The temperature of the reduction step although not critical seems to be best controlled at about 12° C.

Following the reduction steps, the electrode is dried and installed as either the anode or the cathode in a fuel cell.

The embodiments of the invention in which an exclusive property or privilege is claimed are defined as follows:

1. The method of making a silver catalyzed fuel cell electrode comprising the steps of immersing a porous substrate material into a first solution comprising silver (I), and alkali citrate; maintaining said solution at a pH such that silver citrate remains in solution; drawing said first solution into the porous substrate; removing said substrate from said first solution; drying said substrate; and immersing said dried substrate into a second solution comprising a reducing agent selected from the group consisting of hydrazine and lower alkyl substituted hydrazines to reduce the silver (I) to silver adhering to the walls of said substrate's pores.

2. The method according to claim 1 in which the drying step of said substrate is accelerated at 200° F.

3. The method according to claim 1 in which said substrate is sintered nickel having a homogeneous porosity of about 85%, and a pore diameter range of about from 10 to about 20 microns.

4. The method according to claim 1 in which said first solution is from one to nine molar in silver (I).

5. The method according to claim 1 in which said first solution is from 10% to 20% by weight in sodium citrate.

References Cited
UNITED STATES PATENTS

| | | | |
|---|---|---|---|
| 2,694,017 | 11/1954 | Reschan et al. | 106—1 |
| 2,967,135 | 1/1961 | Ostrow et al. | 204—46 |
| 3,234,050 | 2/1966 | Beltzer et al. | 136—120 |
| 3,235,473 | 2/1966 | Le Duc | 136—120 |
| 3,242,011 | 3/1966 | Witherspoon | 136—120 |

ALLEN B. CURTIS, *Primary Examiner.*

A. SKAPARS, *Assistant Examiner.*